United States Patent
David

(10) Patent No.: US 11,688,869 B2
(45) Date of Patent: Jun. 27, 2023

(54) METHOD AND CONTROL UNIT FOR CONDITIONING A FUEL CELL STACK

(71) Applicant: Bayerische Motoren Werke Aktiengesellschaft, Munich (DE)

(72) Inventor: Frank David, Garching (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 525 days.

(21) Appl. No.: 16/507,326

(22) Filed: Jul. 10, 2019

(65) Prior Publication Data

US 2019/0334184 A1 Oct. 31, 2019

Related U.S. Application Data

(63) Continuation of application No. PCT/EP2017/081506, filed on Dec. 5, 2017.

(30) Foreign Application Priority Data

| Jan. 11, 2017 | (DE) | 10 2017 200 364.2 |
| Jan. 17, 2017 | (DE) | 10 2017 200 672.2 |

(51) Int. Cl.
| *H01M 8/10* | (2016.01) |
| *H01M 8/04858* | (2016.01) |
| *H01M 8/04537* | (2016.01) |

(52) U.S. Cl.
CPC ....... *H01M 8/0494* (2013.01); *H01M 8/0488* (2013.01); *H01M 8/0491* (2013.01);
(Continued)

(58) Field of Classification Search
CPC .......... H01M 8/0494; H01M 8/04932; H01M 8/04559; H01M 8/04552; H01M 8/04589;
(Continued)

(56) References Cited

U.S. PATENT DOCUMENTS

| 2011/0091781 A1* | 4/2011 | Folmsbee | B60L 58/30 429/413 |
| 2013/0260266 A1 | 10/2013 | Rapaport et al. | |

(Continued)

FOREIGN PATENT DOCUMENTS

| CN | 102044688 A | 5/2011 |
| CN | 103367778 A | 10/2013 |

(Continued)

OTHER PUBLICATIONS

International Search Report (PCT/ISA/210) issued in PCT Application No. PCT/EP2017/081506 dated Feb. 9, 2018 with English translation (four (4) pages).

(Continued)

*Primary Examiner* — Raymond Alejandro
(74) *Attorney, Agent, or Firm* — Crowell & Moring LLP

(57) ABSTRACT

A method conditions a fuel cell stack of a fuel cell system during a usage operation of the fuel cell system. The method determines that a conditioning of the fuel cell stack is to be carried out for increasing an electrical power provided by the fuel cell stack during usage operation. In addition, the method adjusts at least one operating parameter of the fuel cell system in order to increase a current flow through the fuel cell stack for conditioning the fuel cell stack during usage operation.

11 Claims, 1 Drawing Sheet

(52) U.S. Cl.
CPC ... *H01M 8/04559* (2013.01); *H01M 8/04589* (2013.01); *H01M 8/04604* (2013.01); *H01M 2250/20* (2013.01)

(58) Field of Classification Search
CPC ......... H01M 8/04582; H01M 8/04604; H01M 8/0488; H01M 8/04873; H01M 8/0491; H01M 8/04902; H01M 2250/20
See application file for complete search history.

(56) References Cited

U.S. PATENT DOCUMENTS

| | | |
|---|---|---|
| 2015/0111122 A1 | 4/2015 | Matsusue et al. |
| 2015/0372329 A1 | 12/2015 | Jomori et al. |
| 2016/0006059 A1 | 1/2016 | Kwon et al. |
| 2016/0190613 A1* | 6/2016 | Shiokawa ......... H01M 8/04828 429/413 |
| 2016/0190617 A1 | 6/2016 | Haase et al. |

FOREIGN PATENT DOCUMENTS

| | | |
|---|---|---|
| CN | 104137315 A | 11/2014 |
| CN | 204793042 U | 11/2015 |
| CN | 105492241 A | 4/2016 |
| DE | 103 28 257 A1 | 1/2005 |
| DE | 10 2013 101 829 A1 | 10/2013 |
| DE | 11 2012 005 964 T5 | 11/2014 |
| DE | 11 2013 006 841 T5 | 12/2015 |
| DE | 10 2014 224 890 A1 | 1/2016 |
| JP | 2011-258567 A | 12/2011 |
| TW | 515130 B | 12/2002 |
| WO | WO 2015/110237 A1 | 7/2015 |

OTHER PUBLICATIONS

German-language Written Opinion (PCT/ISA/237) issued in PCT Application No. PCT/EP2017/081506 dated Feb. 9, 2018 (six (6) pages).

German-language Search Report issued in counterpart German Application No. 10 2017 200 672.2 dated Oct. 12, 2017 with partial English translation (10 pages).

Chinese-language Office Action issued in Chinese Application No. 201780082074.6 dated Oct. 22, 2021 with English translation (22 pages).

Chinese-language Office Action issued in Chinese Application No. 201780082074.6 dated May 27, 2022 with English translation (25 pages).

* cited by examiner

METHOD AND CONTROL UNIT FOR CONDITIONING A FUEL CELL STACK

CROSS REFERENCE TO RELATED APPLICATIONS

This application is a continuation of PCT International Application No. PCT/EP2017/081506, filed Dec. 5, 2017, which claims priority under 35 U.S.C. § 119 from German Patent Applications Nos. 10 2017 200 364.2, filed Jan. 11, 2017 and 10 2017 200 672.2, filed Jan. 17, 2017, the entire disclosures of which are herein expressly incorporated by reference.

BACKGROUND AND SUMMARY OF THE INVENTION

The invention relates to a method and a corresponding control unit for conditioning a fuel-cell stack, in particular during startup of the fuel-cell stack.

A road motor vehicle can be equipped with a fuel-cell stack having one or more fuel cells, which generate electric energy for the operation, in particular for the drive, of the vehicle on the basis of a fuel, for example, hydrogen. The fuel can be stored in one or more pressurized tanks of the vehicle. In particular during the initial startup of the fuel-cell stack, the fuel-cell stack can have a reduced electric power in relation to a nominal power of the fuel-cell stack.

The present document relates to the technical object of conditioning the fuel-cell stack of a vehicle in a reliable and efficient manner to optimize the performance of the fuel-cell stack.

According to one aspect, a method is described for conditioning a fuel-cell stack of a fuel-cell system during a usage operation of the fuel-cell system. The fuel-cell stack (also referred to as a stack) comprises one or more fuel cells in this case. The fuel-cell system can be used for the purpose of providing electric energy for the drive of a motor vehicle, in particular a road motor vehicle. In other words, the usage operation can comprise the power supply of an electric drive motor of a motor vehicle. The fuel-cell system can be installed in a motor vehicle for this purpose for the execution of the method.

The method determines that a conditioning of the fuel-cell stack is to be carried out to increase an electric power provided by the fuel-cell stack in the usage operation. A fuel-cell stack, in particular during an initial startup, typically has a reduced power in relation to a nominal power of the fuel-cell stack. It can be determined, for example, that an initial startup of the fuel-cell stack has taken place, and therefore that a conditioning is to be carried out. In the scope of the conditioning of the fuel-cell stack, the power provided by the fuel-cell stack can be increased (up to the nominal power).

For example, a conditioning indicator can be ascertained, which indicates a cumulative extent of conditioning of the fuel-cell stack (for example, since the initial startup of the fuel-cell stack). The conditioning indicator can indicate in this case, for example, a cumulative duration during which a conditioning of the fuel-cell stack has already taken place. Alternatively or additionally, the conditioning indicator can indicate a cumulative current, which has already flowed (for example, since the initial startup) through the fuel-cell stack. It can then be determined on the basis of the conditioning indicator whether a conditioning of the fuel-cell stack is to be carried out or not. A conditioning of the fuel-cell stack can then take place (possibly only then) if it has been determined (for example, on the basis of the conditioning indicator) that a conditioning of the fuel-cell stack is to be carried out.

The method furthermore adapts at least one operating parameter of the fuel-cell system to increase a current flow and/or a current through the fuel-cell stack during the usage operation for the conditioning of the fuel-cell stack (in particular for the conditioning of a separator of the fuel-cell stack). In this case, the adaptation of the operating parameter can take place in dependence on the conditioning indicator. In particular, an adaptation of the operating parameter for conditioning the fuel-cell stack can only take place if it has been determined (for example, on the basis of the conditioning indicator) that a conditioning of the fuel-cell stack is to be carried out.

A conditioning of a fuel-cell stack during the usage operation of the fuel-cell stack is thus enabled. The performance of a fuel-cell stack can thus be increased in a cost-effective and time-efficient manner.

The at least one operating parameter can be adapted to reduce an operating voltage of the fuel-cell stack. Alternatively or additionally, the at least one operating parameter can be adapted to increase the current through the fuel-cell stack at a specific electric power. In other words, it is possible to cause (by adapting at least one operating parameter) the fuel-cell stack to supply a relatively high current with a relatively low voltage at a specific power. The conditioning of the fuel-cell stack can be improved and accelerated by the increased current flow.

The fuel-cell system can comprise a voltage converter, which is configured to convert electric power having an input voltage into electric power having an output voltage (for example, having an operating voltage for a drive motor of a motor vehicle). In the scope of the method, the voltage converter can be used to convert the electric power provided by the fuel-cell stack (having reduced voltage and having increased current) into electric power having the output voltage. The voltage converter can be designed for this purpose to provide different voltage conversion ratios (in a continuous manner).

The operating parameter of the fuel-cell system can be adapted in such a way that an efficiency of the fuel-cell system is reduced (for conditioning the fuel-cell stack). Due to the reduction of the efficiency, an increase of the current through the fuel-cell stack (and thus a conditioning of the fuel-cell stack) can in turn be effectuated.

The operating parameter (which is adapted for conditioning the fuel-cell stack) can comprise a quantity of oxidant (for example, air) which is supplied to the fuel-cell stack. In this case, the quantity of oxidant can be reduced, which typically results in a reduction of the voltage of the fuel-cell stack and (at given power) an increase of the current. The quantity of oxidant can be reduced, in particular in such a way that a stoichiometric ratio $\lambda$ of available quantity of oxidant to required quantity of oxidant is less than 1.5 or 1.2 (for example, substantially 1). A conditioning of a fuel-cell stack can be effectuated in a reliable manner by the adaptation of the quantity of oxidant.

The fuel-cell system can comprise an oxidant conveyor, which is configured to convey oxidant to the fuel-cell stack. In particular, the quantity of oxidant which is supplied to the fuel-cell stack can be adapted by means of the oxidant conveyor. The operating parameter (which is adapted for conditioning the fuel-cell stack) can comprise an operating parameter of the oxidant conveyor, in particular a pressure and/or a speed of a compressor of the oxidant conveyor. A conditioning of a fuel-cell stack can thus be effectuated in a reliable manner.

In particular the introduction of water plays an important role for the conditioning of a fuel-cell stack, since contaminants can be washed out of the production process of a fuel-cell stack and/or since water required for the proton transfer can be intercalated in the fuel-cell stack by the introduction of water. In particular, water can be introduced into a separator and/or into a membrane of the fuel-cell stack in the scope of the conditioning. For the conditioning, i.e., for a break-in phase, the humidity and/or temperature can be set, above all on the cathode side of the fuel-cell stack, in such a way that liquid water is present, and/or that the quantity of liquid water is increased (in comparison to a normal operation, in which dedicated conditioning does not take place).

The method can therefore carry out a measure to increase the relative humidity of the fuel-cell stack during the usage operation for the conditioning of the fuel-cell stack. In this case, in particular the relative humidity can be increased at a cathode of the fuel-cell system. The measure to increase the relative humidity can comprise temperature controlling, in particular cooling, the oxidant supplied to the fuel-cell stack. The quantity of liquid water in the fuel-cell stack can be increased by the cooling of the oxidant. In particular it can be effectuated that, the quantity of water vapor which is absorbed by the oxidant (and conveyed out of the fuel-cell stack) is reduced. The relative humidity in the fuel-cell stack can thus be increased during the conditioning. This results in an acceleration of the conditioning and/or a shortening of the break-in phase.

Alternatively or additionally, the oxidant supplied to the fuel-cell stack can be humidified as a measure to increase the relative humidity. The fuel-cell system can comprise, for example, a device for increasing and/or for adapting the humidity of the oxidant (for example, a membrane humidifier and/or a water injection). A quantity of liquid water which is present on the cathode side of the fuel-cell system can be increased by an adaptation, in particular by an increase of the humidity of the oxidant. The conditioning, in particular the break-in phase, of the fuel-cell stack can thus be accelerated.

The operating parameter and/or humidity of the fuel-cell stack can therefore be controlled in such a way that sufficient liquid water results during the conditioning on the cathode side of the fuel-cell stack. The fuel-cell system can comprise, for example, a humidifier to set the humidity. Furthermore, a reduction of the operating temperature typically results in an increased liquid water proportion in the fuel-cell stack.

The method can detect a conditioning point in time, at which an electric power to be provided by the fuel-cell stack in the usage operation is equal to or greater than a minimum power. In other words, one or more conditioning points in time or time periods can be detected, in which at least a specific minimum power is to be provided in the usage operation by the fuel-cell stack. The operating parameter can then (for conditioning the fuel-cell stack) be adapted at the conditioning point in time. In particular, an adaptation of an operating parameter for conditioning the fuel-cell stack can possibly only then take place if at least the minimum power is to be provided by the fuel-cell stack. It can thus be ensured that the conditioning of the fuel-cell stack is carried out in a reliable manner. A "piece-by-piece" conditioning of the fuel-cell stack can thus take place in a sequence of discrete conditioning time periods in a reliable manner.

The fuel-cell system can comprise an electric energy accumulator (for example, a lithium-ion accumulator), which is configured to store current generated by the fuel-cell stack. In other words, the electric energy generated by the fuel-cell stack can be partially temporarily stored in an electric energy accumulator. For example, the fuel-cell system can be part of a drive system of a motor vehicle. An electric drive motor of the motor vehicle, for example, can be driven using the electric energy from the fuel-cell stack. The electric energy accumulator can be used to provide additional electric power (in addition to the electric power from the fuel-cell stack) at particularly high load (for example, for a particularly high acceleration). Furthermore, the electric energy accumulator can be used to be able to operate the fuel-cell stack in the most energy-efficient possible operating states. Moreover, the electric energy accumulator can be used to provide electric energy for one or more further assemblies of the vehicle (for example, before an operating start of the fuel-cell stack).

The method can reduce a charge state of the energy accumulator before adapting the operating parameter for the conditioning of the fuel-cell stack (i.e., in the lead-up to the conditioning of the fuel-cell stack). For example, the charge state in the usage operation can typically be kept at a target charge state, to keep ready a specific quantity of additional electric power. The target charge state is typically between a maximum charge state and a minimum charge state of the energy accumulator (for example, at 90% of the maximum charge state).

In the lead-up to the conditioning of the fuel-cell stack, the charge state can be reduced below the target charge state (for example, to 20%, 10%, or less of the target charge state or the maximum charge state). Free capacity can thus be provided in the electric energy accumulator in the lead-up to the conditioning to be able to operate the fuel-cell stack with the highest possible electric power during the conditioning and/or to enable the highest possible current flow through the fuel-cell stack during the conditioning. The conditioning of the fuel-cell stack can thus be further improved.

The method can predict, at a first point in time, a conditioning point in time for a conditioning of the fuel-cell stack. In particular, a conditioning point in time can be predicted which is suitable for a conditioning of the fuel-cell stack. For example, a conditioning point in time can be predicted at which an electric power to be generated by the fuel-cell stack reaches or exceeds a specific minimum power. The charge state of the energy accumulator can then be reduced between the first point in time and the predicted conditioning point in time. The electric power to be generated can thus be reliably increased during the conditioning and the conditioning can be improved.

If the fuel-cell system is part of a vehicle, the conditioning point in time can then advantageously be predicted on the basis of a planned travel route of the vehicle. For example, an incline on an upcoming travel route can be predicted as a conditioning point in time. In particular, a conditioning position can be ascertained at which the required power demand for a conditioning exists. The conditioning point in time, at which the conditioning position will be reached, can then be predicted on the basis of the travel velocity of the vehicle, on the basis of the distance, on the basis of weather data, and/or on the basis of traffic data. A suitable conditioning point in time can thus be predicted in a reliable manner.

According to a further aspect, a control unit is described for a fuel-cell system. The control unit is configured to determine that a conditioning of a fuel-cell stack of the fuel-cell system is to be carried out to increase an electric power provided by the fuel-cell stack in a usage operation. Moreover, the control unit is configured, during the usage operation, to adapt at least one operating parameter of the fuel-cell system to increase a current flow through the fuel-cell stack for the conditioning of the fuel-cell stack.

According to a further aspect, a vehicle (in particular a road motor vehicle, for example, a passenger automobile or a utility vehicle) is described, which includes the control unit described in this document.

According to a further aspect, a software (SW) program is described. The SW program can be configured to be executed on a processor (for example, on a control unit) and to thus execute the method described in this document.

According to a further aspect, a storage medium is described. The storage medium can comprise an SW program, which is configured to be executed on a processor, and to thus execute the method described in this document.

It is to be noted that the devices and systems described in this document can be used both alone and also in combination with other devices and systems described in this document. Furthermore, any aspects of the devices and systems described in this document can be combined with one another in manifold ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
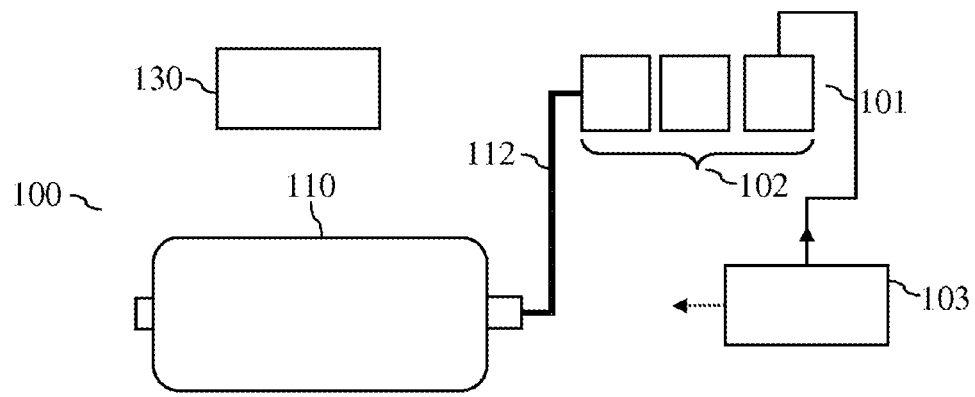
FIG. 1 shows an exemplary fuel-cell system having a fuel-cell stack.
Figure 2:
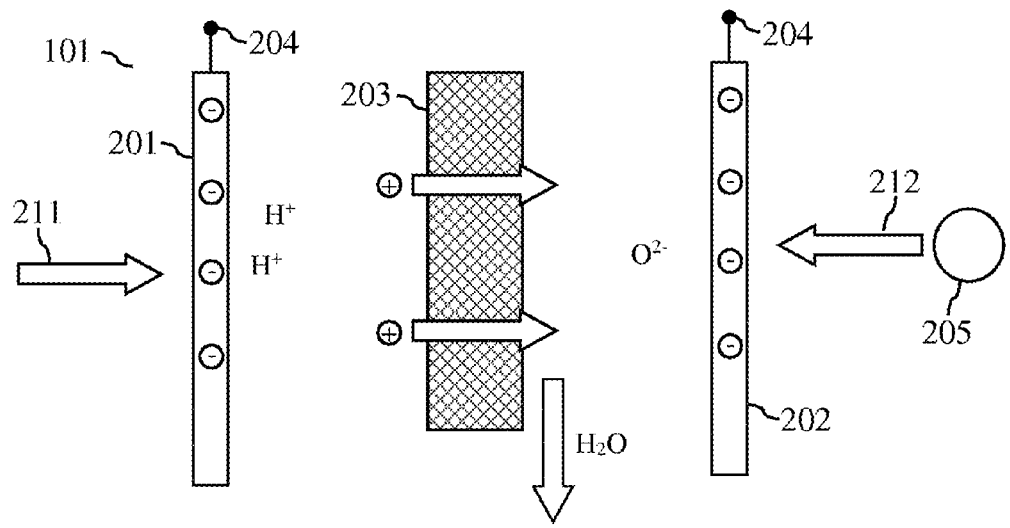
FIG. 2 shows an exemplary structure of a fuel cell.

As described at the outset, the present document relates to the cost-effective and time-efficient conditioning of a fuel-cell stack, in particular during startup of the fuel-cell stack. FIG. 1 shows a fuel-cell system 100 having a fuel-cell stack 102 having at least one fuel cell 101. The fuel-cell system 100 is intended, for example, for mobile applications such as motor vehicles, in particular for providing the energy for at least one drive machine for the propulsion of a motor vehicle. A fuel cell 101 is an electrochemical energy converter, which converts fuel and oxidant into reaction products and produces electricity and heat at the same time. A fuel cell 100 comprises (as shown in FIG. 2) an anode 201 and a cathode 202, which are separated by an ion-selective or ion-permeable separator 203. The anode 201 is supplied with fuel 211. Preferred fuels 211 are: hydrogen, low-molecular-weight alcohol, biofuels, or liquefied natural gas. The cathode 202 is supplied with oxidant 212. Preferred oxidants 212 are: air, oxygen, and peroxide. The ion-selective separator 203 can be designed, for example, as a proton exchange membrane (PEM). A cation-selective polymer electrolyte membrane is preferably used. Materials for such a membrane are, for example: Nafion®, Flemion®, and Aciplex®.

A fuel-cell system 100 comprises, in addition to the at least one fuel cell 101, peripheral system components (BOP components), which can be used during the operation of the at least one fuel cell 101. In general, multiple fuel cells 101 are combined to form a fuel-cell stack or stack 102. Furthermore, the fuel-cell system 100 typically comprises at least one pressurized tank 110, which can be used to provide the fuel 211 for the one or more fuel cells 101. The pressurized tank 110 is connected via lines 112 to the one or more fuel cells 101.

The anode 201 and the cathode 202 of a fuel cell 101 and/or of a fuel-cell stack 102 can be connected using contact parts 204. An operating voltage is typically applied between the contact parts 204 (for example, approximately 1 V for a fuel cell 101), and a current can be provided. The operating voltage of a fuel-cell stack 102 can be increased by the series connection of multiple fuel cells 101 (i.e., by providing a stack or fuel-cell stack 102).

The fuel cells 101 of the fuel-cell system 100 generally each comprise two separator plates (not shown). The ion-selective separator 203 of a fuel cell 101 is generally arranged between two separator plates in each case. The one separator plate forms the anode 201 together with the ion-selective separator 203. The further separator plate arranged on the opposing side of the ion-selective separator 203, however, forms the cathode 202 together with the ion-selective separator 203. Gas channels for fuel 211 and/or for oxidant 212 are preferably provided in the separator plates.

The separator plates can be designed as monopolar plates and/or as bipolar plates. In other words, a separator plate expediently has two sides, wherein the one side forms the anode 201 of a first fuel cell 101 together with an ion-selective separator 203 and the second side forms, together with a further ion-selective separator 203 of an adjacent second fuel cell 101, the cathode 202 of the second fuel cell 101.

So-called gas diffusion layers (GDL) are generally also provided between the ion-selective separators 203 and the separator plates.

The fuel-cell system 100 comprises an anode subsystem, which is formed by the fuel-conducting components of the fuel-cell system 100. An anode subsystem can have at least one pressurized container 110, at least one tank shutoff valve (=TAV), at least one pressure reducer, at least one anode supply line leading to the anode inlet, an anode chamber in the fuel-cell stack 102, at least one anode exhaust gas line leading away from the anode outlet, at least one water separator (=AWS), at least one anode purge valve (=APV), at least one active or passive fuel recirculation conveyor (=ARE or ARB), and/or at least one recirculation line and also further elements. The main task of the anode subsystem is to bring and distribute fuel 211 to the electrochemically active surfaces of the anode chamber and to discharge anode exhaust gas.

Furthermore, the fuel-cell system 100 comprises a cathode subsystem. The cathode subsystem is formed from the oxidant-conducting components. A cathode subsystem can have at least one oxidant conveyor 205, at least one cathode supply line leading to the cathode inlet, at least one cathode exhaust gas line leading away from the cathode outlet, a cathode chamber in the fuel-cell stack 102, and also further elements. The main task of the cathode subsystem is to bring and distribute oxidant 212 to the electrochemically active surfaces of the cathode chamber and to discharge unconsumed oxidant 212.

A fuel-cell system 100 typically comprises at least one cooling circuit, which is configured for the temperature control of the fuel-cell stack 102 of the fuel-cell system 100. The cooling circuit expediently comprises at least one heat exchanger, at least one coolant conveyor, and the fuel-cell stack 102, through which the coolant flows. The at least one heat exchanger is, for example, a radiator, through which air flows and which can be assisted by a fan. The cooling circuit is generally designed in such a way that coolant can circulate between the heat exchanger and the at least one fuel cell 101 of the fuel-cell stack 102. In particular, the coolant heated in a fuel cell 101 can flow from the fuel cell 101 into the at least one heat exchanger, where it then cools down, before it subsequently flows back into the fuel cell 101.

It is to be noted that although coolant is referred to here, the coolant is not only restricted to the cooling. Rather, the coolant can also be used for heating or in general for the temperature control of a fuel cell 101. Water, possibly with additives, is preferably used as the coolant. The cooling system can also be used for equal distribution of heat (i.e., the avoidance of high temperature gradients) within the fuel cells 101 and/or within the fuel-cell stack 102.

The fuel-cell system 100 can comprise a cell monitoring system. The cell monitoring system (cell voltage monitoring system or CVM system) can be designed to monitor the state of at least one cell 101. In general, the cell monitoring system monitors the state of a plurality of fuel cells 101. In this context, monitor means that the system can determine the state of the monitored cells 101 directly or indirectly. An occurring degradation and/or a cell failure can thus advantageously be recognized early and corresponding countermeasures can be initiated. The service life of a fuel cell 101 can thus be lengthened and/or the performance of the entirety of the cells can be enhanced by suitable countermeasures.

At least one measured variable with respect to the state of a fuel cell 101 can advantageously be detected directly or indirectly. The measured variable can be in particular the electric voltage of the monitored cell 101. The individual cell voltages of multiple or all cells 101 and the total voltage are advantageously ascertained. Furthermore, the current flowing through the fuel-cell stack 102 is preferably determined. From the measured voltages, the CVM system can determine, for example, one of the following values: minimum, maximum, and mean value of the individual cell voltage. Voltage deviations between the individual cells and/or a mean value of the individual cell voltages can thus advantageously be recognized. Further individual cell analysis methods are preferably carried out such as, for example, an impedance computation (for example: electrochemical impedance spectroscopy).

The cell monitoring system preferably comprises at least one cell monitoring module (FCSC). The cell monitoring module can comprise, for example, an analog-to-digital converter, which converts an analog signal of a fuel cell 101 into a digital signal. For example, the voltage can be detected as an analog input signal, which is converted into a digital signal, for example, a 12-bit signal. The module can advantageously comprise at least one multiplexer. The multiplexer can be designed to detect the measurement signals of the individual fuel cells 101 of a cell group (for example, of a fuel-cell stack 102) and then to transmit these analog signals to the analog-to-digital converter. Such a unit can be referred to, for example, as an analog-to-digital converter module (ADC module). In the case of a fuel cell 101, reference can also be made to a fuel cell supervisory circuit (FCSC). The cell monitoring module can preferably comprise further analysis functionalities of the cell monitoring system, in particular by observation of differential voltages of directly adjacent separators 203.

The at least one cell monitoring module is generally connected via a data bus to at least one control device. The following can be used here as the data bus, for example: serial peripheral interface (SPI), possibly without chip select, isoSPI, controller area network (CAN), FlexRay, MOST, local interconnect network (LIN).

The system 100 disclosed here furthermore comprises at least one control device 103 (also referred to as a control unit). The control device 103 is designed, inter alia, to communicate via the data bus with the at least one cell monitoring module (=bus user) and/or the cell monitoring system. The control device 103 can be designed, inter alia, to regulate and/or control the cell monitoring. In this case, it can be an engine control unit (ECU). For example, the control device 103 for a fuel-cell system can also be referred to as a stack management unit (SMU).

As shown in FIG. 2, a fuel-cell system 100 comprises at least one oxidant conveyor 205. The oxidant conveyor 205 is configured to convey the oxidant 212 participating in the electrochemical reaction to the one or more fuel cells 101. The oxidant conveyor 205 (also called fluid conveyor unit) can be designed, for example, as a compressor, particularly preferably as an air-bearing turbo compressor or centrifugal compressor. The oxidant conveyor 205 preferably has an operating speed range of approximately 15,000 rpm to approximately 170,000 rpm, and particularly preferably from approximately 25,000 rpm to approximately 130,000 rpm.

If needed, the stoichiometric ratio λ of the oxidant 212 can be changed. The stoichiometric ratio λ of the oxidant 212 specifies by which factor more oxidant 212 is provided than is actually necessary for the reaction at the cathode 202. If air is used as the oxidant 212, said stoichiometric ratio can also be referred to as the air ratio λ or the air number λ. The air ratio λ represents the air mass $m_{L\text{-}tats}$ actually available for the electrochemical reaction in the at least one fuel cell 101 in relation to the minimum required stoichiometric air mass $m_{L\text{-}st}$, which is required for a complete electrochemical reaction in a fuel cell 101. The following thus applies:

$$\lambda = \frac{m_{L\text{-}tats}}{m_{L\text{-}st}}$$

During startup of a fuel-cell stack 102, a so-called "break-in" procedure is typically required so that the fuel-cell stack 102 reaches its full performance capacity (for example, a specific electric nominal power and/or a maximum power). In the case of a separator 203 designed as a PEM, above all an intercalation of water in the membrane takes place in this case. Relatively high stack currents are typically generated over a time period of multiple hours for the "break-in" procedure.

To carry out the "break-in" procedure, a fuel-cell stack 102 can be installed on a test stand after the final assembly of the fuel-cell stack 102 and operated for multiple hours. Following the "break-in" procedure (i.e., following the conditioning of the fuel-cell stack 102), the fuel-cell stack 102 can be rendered inert and disassembled before an installation in the vehicle can take place. A further startup can then take place in the vehicle for the function check of the fuel-cell system 100. The procedure for the startup of a fuel-cell system 100 is therefore typically associated with relatively high costs and with a relatively high time expenditure.

The "break-in" procedure can advantageously take place during the usage operation of a fuel-cell system 100, in particular during the usage operation within a vehicle. In this case, the "break-in" procedure (i.e., the conditioning of the fuel-cell stack 102) can possibly be stretched over a longer time period. The fuel-cell system 100 then does indeed have a reduced power until the completion of the "break-in" procedure, but this reduced power is typically sufficient to drive a vehicle reliably and safely. The available power of a fuel-cell system 100 is typically 50% or more of the maximum power and/or nominal power of a fuel-cell system 100 even before carrying out the "break-in" procedure.

The control unit 103 can be configured to adapt to one or more operating parameters of the fuel-cell system 100 in the first operating hours of the fuel-cell system 100, in particular in the first operating hours of a vehicle having the fuel-cell system 100, in order to carry out the "break-in" procedure. The one or more operating parameters can be changed in such a way that the fuel-cell system 100 is operated at the highest possible stack power and possibly at the lowest possible operating temperature (to increase the proportion of liquid water in the fuel-cell system 100). For this purpose, the efficiency of one or more components of the fuel-cell system 100 can be intentionally worsened (for example, by increasing the compressor pressure and/or by increasing the compressor speed of a compressor of the oxidant conveyor 205). Furthermore, the stack voltage can be intentionally reduced, in particular by stoichiometric depletion of the cathode 202, i.e., by reducing the supplied quantity of oxidant 212. A high power consumption of the fuel-cell stack 102 can thus also be achieved with a reduced net power.

Furthermore, a temperature control (in particular a cooling) of the oxidant 212 and/or of the fuel-cell stack 102 can take place. Moreover, a humidification of the oxidant 212 can take place. The quantity of liquid water in a fuel-cell stack 102, in particular at the cathode 204 of a fuel-cell stack 102, can thus be increased, which results in an acceleration of the "break-in" procedure.

The fuel-cell system 100 can comprise an electric energy accumulator 130 (in particular a high-voltage accumulator, which is operated, for example, at 300 V or more) (see FIG. 1). The energy accumulator 130 can be used as a buffer and/or for providing electric energy for the accessories of a vehicle (in particular during the starting of the vehicle). The operating strategy of a fuel-cell system 100 during the usage operation usually controls the interaction of fuel-cell stack 102 and HV accumulator 130 in such a way that sufficient electric energy is always stored in the accumulator 130 to be able to provide a specific maximum total power (as the total of the maximum discharged power of the accumulator 130 and the maximum power of the fuel-cell stack 102) for a certain time. The energy accumulator 130 can be set to a target charge state for this purpose. In this case, maximum charge states and minimum charge states (i.e., cycling) of the electric energy accumulator 130 are typically avoided in the scope of the operating strategy for the usage operation (to extend the service life of the energy accumulator 130).

For the break-in phase, the operating strategy can be adapted in such a way that the charge state of the electric energy accumulator 130 is intentionally reduced in the usage operation (for example, down to the minimum charge state or down to a charge state of 20%, 10%, or less of the maximum charge state). For this purpose, the fuel-cell stack 102 can be operated at a minimum power or in a standby mode (no power delivery). Furthermore, all of the propulsion energy of a vehicle can be taken from the energy accumulator 130. The reduction of the charge state of the electric energy accumulator 130 can take place in this case in the lead-up to a break-in procedure.

The advantage of the reduction of the charge state of the electric energy accumulator 130 is that thus even in the event of a moderate load demand, the fuel-cell power can be substantially increased for a certain time to be able to carry out a conditioning, i.e., a break-in procedure. In particular, not only electric energy for the propulsion of a vehicle but rather also electric energy for increasing the charge state of the electric energy accumulator 130 can thus be generated during the conditioning. The duration of a possible conditioning is dependent in this case on the available storage capacity of the energy accumulator 130, and typically rises with increasing storage capacity.

For such an operating strategy, data such as GPS, traffic, weather, etc. can be used. For example, an upcoming incline can be recognized beforehand on the basis of a planned travel route for a vehicle. The electric energy accumulator 130 can then be intentionally emptied in such a way that the electric energy accumulator 130 is substantially empty at the beginning of the incline. The fuel-cell stack 102 can then be operated at high load for the entire incline to enable an efficient conditioning.

Figure 3:
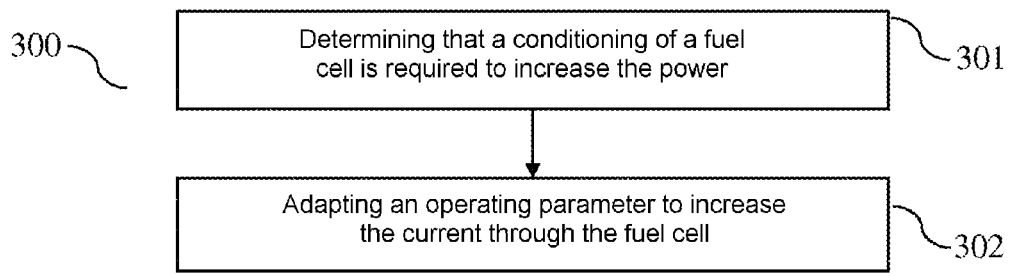
FIG. 3 is a flow chart of an exemplary method for conditioning a fuel-cell stack.

FIG. 3 shows a flow chart of an exemplary method 300 for conditioning a fuel-cell stack 102 of a fuel-cell system 100 during a usage operation of the fuel-cell system 100. During the usage operation, the electric energy generated in this case by the fuel-cell system 100 is used (for example, to drive an electric drive motor of a vehicle). The fuel-cell system 100 can thus preferably be installed in a system (for example, in a motor vehicle) and can be used for providing electric energy for the system (for example, for the drive motor of a motor vehicle).

The method 300 comprises determining 301 that a conditioning of the fuel-cell stack 102 is to be carried out to increase an electric power provided by the fuel-cell stack 102 in the usage operation. For example, it can be recognized (for example, by means of a conditioning indicator) that a complete "break-in" procedure of the fuel-cell stack 102 was not yet carried out, and that therefore a conditioning of the fuel-cell stack 102 is still required to enable the maximum power and/or the nominal power of the fuel-cell system 100 and/or of the fuel-cell stack 102. For example, a specific time period after startup of a fuel-cell system 100 can be defined as the conditioning time period. A conditioning of the fuel-cell stack 102 can then take place within this conditioning time period.

The method 300 furthermore comprises adapting 302 at least one operating parameter of the fuel-cell system 100 to increase a current flow or a current through the fuel-cell stack 102 during the usage operation for the conditioning of the fuel-cell stack 102. In particular, an operating parameter can be adapted to change an operating point of the fuel-cell system 100 in such a way that (at a specific electric power) an inflated current flows through the fuel-cell stack 102. An accelerated accumulation of water in the one or more separators 203 of the fuel-cell stack 102 and thus an increase of the available electric power of the fuel-cell system 100 can thus be effectuated during the usage operation.

The adaptation of one or more operating parameters of a fuel-cell system 100 for the conditioning of a fuel-cell stack 102 enables the direct usage of a fuel-cell system 100 in a system (for example, in a vehicle). Carrying out a dedicated "break-in" procedure on a test stand can thus be avoided. In particular, a fuel-cell system 100 can thus be directly installed in a vehicle, whereby the time expenditure and the costs for the provision of a fuel-cell system 100 can be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for conditioning a fuel-cell stack of a fuel-cell system during a usage operation of the fuel-cell system, the method comprising:
    directly installing the fuel cell system in a vehicle, thereby avoiding a break-in procedure on a test stand;
    after directly installing the fuel cell system in the vehicle, determining that a conditioning of the fuel-cell stack is to be carried out to increase an electric power provided by the fuel-cell stack in the usage operation, the fuel cell having a reduced power until completion of the conditioning; and
    adapting at least one operating parameter of the fuel-cell system to increase a current flow through the fuel-cell stack during the usage operation for the conditioning of the fuel-cell stack, the adapting at least one operating parameter consisting of:
    reducing a quantity of oxidant supplied to the fuel-cell stack, the quantity of oxidant being reduced such that a stoichiometric ratio of available quantity of oxidant to required quantity of oxidant is less than 1.5,
    cooling an oxidant supplied to the fuel-cell stack by an oxidant conveyor, and/or
    controlling a speed of a compressor of the oxidant conveyor.

2. The method according to claim 1, wherein the adapting the at least one operating parameter causes:
    a reduction in an operating voltage of the fuel-cell stack; and/or
    an increase of the current through the fuel-cell stack at a specific electric power.

3. The method according to claim 1, wherein
    the at least one operating parameter of the fuel-cell system is adapted in such a way that an efficiency of the fuel-cell system is reduced.

4. The method according to claim 1, further comprising:
    detecting a conditioning point in time, at which an electric power to be provided by the fuel-cell stack in the usage operation is equal to or greater than a minimum power; wherein
    the at least one operating parameter is adapted at the conditioning point in time.

5. The method according to claim 1, further comprising:
    ascertaining a conditioning indicator, which indicates a cumulative extent of conditioning of the fuel-cell stack; wherein
    the at least one operating parameter is adapted in dependence on the conditioning indicator.

6. The method according to claim 5, wherein
    the conditioning indicator indicates one or both of:
    a cumulative duration, during which the at least one operating parameter was adapted for the conditioning of the fuel-cell stack; and
    a cumulative current, which has flowed through the fuel-cell stack.

7. The method according to claim 1, wherein
    the usage operation comprises a power supply of an electric drive motor of a motor vehicle.

8. The method according to claim 1, wherein
    the fuel-cell system comprises an electric energy accumulator, which is configured to store current generated by the fuel-cell stack; and
    the method further comprises reducing a charge state of the energy accumulator before adapting the at least one operating parameter for the conditioning of the fuel-cell stack.

9. The method according to claim 8, further comprising:
    predicting, at a first point in time, a conditioning point in time for a conditioning of the fuel-cell stack, wherein
    the charge state of the energy accumulator is reduced between the first point in time and the predicted conditioning point in time.

10. The method according to claim 9, wherein
    the fuel-cell system is part of a vehicle; and
    the conditioning point in time is predicted on the basis of a planned travel route of the vehicle.

11. The method according to claim 1, wherein the adapting at least one operating parameter consists of:
    reducing the quantity of oxidant supplied to the fuel-cell stack, the quantity of oxidant being reduced such that the stoichiometric ratio of available quantity of oxidant to required quantity of oxidant is less than 1.5,
    cooling the oxidant supplied to the fuel-cell stack by the oxidant conveyor, and
    controlling the speed of the compressor of the oxidant conveyor.

* * * * *